US012235151B2

(12) United States Patent
Von Muenster

(10) Patent No.: US 12,235,151 B2
(45) Date of Patent: Feb. 25, 2025

(54) MATERIAL WEIGHT MEASUREMENT SYSTEM

(71) Applicant: Scale-Tec, Ltd., Anamosa, IA (US)

(72) Inventor: Nicholas Von Muenster, Anamosa, IA (US)

(73) Assignee: Scale-Tec, Ltd., Anamosa, IA (US)

( * ) Notice: Subject to any disclaimer, the term of this patent is extended or adjusted under 35 U.S.C. 154(b) by 580 days.

(21) Appl. No.: 17/576,542

(22) Filed: Jan. 14, 2022

(65) Prior Publication Data

US 2022/0228906 A1 Jul. 21, 2022

Related U.S. Application Data

(60) Provisional application No. 63/139,128, filed on Jan. 19, 2021.

(51) Int. Cl.
*G01G 23/14* (2006.01)
*A01D 90/12* (2006.01)
*G01G 21/22* (2006.01)
*G06T 7/00* (2017.01)
*H04N 7/18* (2006.01)

(52) U.S. Cl.
CPC ............. *G01G 23/14* (2013.01); *G01G 21/22* (2013.01); *G06T 7/0004* (2013.01); *H04N 7/181* (2013.01); *A01D 90/12* (2013.01)

(58) Field of Classification Search
CPC .... G01G 21/22; G01G 21/2314; H04N 7/181; H04N 7/183; A01D 90/12; G06T 7/0004
See application file for complete search history.

(56) References Cited

U.S. PATENT DOCUMENTS

| | | | | |
|---|---|---|---|---|
| 8,097,820 B2* | 1/2012 | Klubertanz | ............ | G01G 19/12 |
| | | | | 177/116 |
| 11,650,093 B2* | 5/2023 | Von Muenster | ....... | G01G 13/28 |
| | | | | 177/1 |
| 12,013,280 B2* | 6/2024 | Von Muenster | ....... | G01G 13/28 |
| 2011/0220677 A1* | 9/2011 | Bertolani | ............. | G01G 11/086 |
| | | | | 222/1 |
| 2012/0099948 A1* | 4/2012 | Bump | .................... | B65G 69/00 |
| | | | | 414/21 |
| 2013/0045067 A1* | 2/2013 | Pickett | ................. | A01B 69/008 |
| | | | | 414/345 |
| 2014/0311113 A1* | 10/2014 | Bonefas | ............... | A01D 34/001 |
| | | | | 56/10.2 R |
| 2015/0023767 A1* | 1/2015 | Affleck | .................. | B65G 69/00 |
| | | | | 414/21 |
| 2020/0113123 A1* | 4/2020 | Shearer | ................ | A01B 79/005 |
| 2021/0294337 A1* | 9/2021 | Van Mill | ............. | G05D 1/0246 |

* cited by examiner

*Primary Examiner* — Natalie Huls
(74) *Attorney, Agent, or Firm* — SHUTTLEWORTH & INGERSOLL, PLC; Jason R. Sytsma

(57) ABSTRACT

A machine vision camera combined to one of the first storage carrier and the second storage carrier for detecting an offloading event. A sensor for measuring the weight of the material offloaded from the first storage carrier to the second storage carrier. A scale controller in communication with the machine vision camera and the sensor. The scale controller enters a tear mode in response to the beginning of offloading event and records and stores the weight of material offloaded from the first storage carrier to the second storage carrier as measured by the sensor.

17 Claims, 13 Drawing Sheets

MATERIAL WEIGHT MEASUREMENT SYSTEM

CROSS-REFERENCE TO RELATED APPLICATIONS

This application claims priority to U.S. Provisional Patent Application No. 63/139,128 filed on Jan. 19, 2021 the contents of which are hereby incorporated by reference herein.

BACKGROUND INFORMATION

Today with the fast pace of agriculture operations, traceability, operator error, accuracy of technology, and most importantly safety are all considerations during a successful farming operation. With an increased focus on ensuring that farming equipment is operated safely, yet efficiently, precision agriculture technology needs to ensure that it accomplishes both of these tasks simultaneously, as to add to the human factor element of an operator of equipment, focused at the task at hand.

One element of the problem involves accurately recording the unload of the mobile storage carrier, commonly referred to as a grain cart, by the operator of the grain cart. Commonly this involves the operator manually pressing a button on a scale controller to initiate a record event, and press the button again at the end of the offloading operation on the scale controller, to end the record event, creating a complete unload record. With the fast pace of the farming operation within the field environment, as well as the human factor element of ensuring the grain cart is positioned properly to allow for an accurate measurement of weight, ensuring the grain cart does not collide with the truck or trailer it is offloading into, unfolding the auger and positioning the auger offloading apparatus into position, initiating the drive mechanism to power the auger, and ensuring that the material inside the grain cart does not spill over the top of the truck or trailer can be very task saturating, especially to a new grain cart operator.

Alongside the task saturation of the grain cart operator is another element in remembering to write down the truck or trailer receiving the load, with the date and time of the unload, as well as the originating field. Commonly, operators attempt to log this information in a written log prior to, during, and after the offloading of the grain cart into a truck or trailer. This presents another consideration of task saturation, causing the operator to fail to cross check their environment, narrowing their situational awareness on what is happening around the grain cart, such as people approaching or equipment approaching the rear of the grain cart, for which is blocked from the line of site from the operator.

The human factor demand is considerable to the task saturation within a 3 to 5 minute operating window of offloading. The element of offloading involves at least 12 steps of operation that dynamically effect of ensuring accuracy and, most importantly, safety of the offloading operation of a grain cart.

Accordingly, there is a need for an improved system is needed and disclosed to accomplish the safety of operation of the mobile storage container, commonly known as a grain cart, as well as ensuring that the task saturation of the operator is reduced by the addition of automation of some but not all the processes required of the operator.

SUMMARY

Disclosed is a system for measuring the weight of material offloaded from a first storage carrier to a second storage carrier. The system can comprise a machine vision camera combined to one of the first storage carrier and the second storage carrier for detecting an offloading event. A sensor can be provided for measuring the weight of the material offloaded from the first storage carrier to the second storage carrier. A scale controller can be in communication with the machine vision camera and the sensor. The scale controller enters a tear mode in response to the beginning of offloading event and records and stores the weight of material offloaded from the first storage carrier to the second storage carrier as measured by the sensor.

The scale controller can be in communication with machine vision camera. A first signal representative of the offloading event is received by the scale controller and in response to the offloading event, the scale controller records a beginning weight. The scale controller can receive from the machine vision camera a second signal representative of the end of the offloading event, and in response the scale controller records an ending weight. The scale controller can determine a weight record for the material offloaded from the first storage carrier to the second storage carrier from a difference in weight.

In an embodiment, the scale controller is in communication with a position subsystem to record the location of the weight record. The position subsystem can comprise a GPS receiver to provide a location of the first storage carrier.

In another embodiment, an image ID subsystem is provided for identifying an image label to associate with one of the first storage carrier and the second storage carrier to allow the scale controller to record the identification of the second storage carrier associated with the weight record.

In yet another embodiment, the scale controller comprises a scale interface to present to a visual display of the changing weight.

In yet another embodiment, the machine vision camera is combined to the exterior of the one of the first storage carrier and the second storage carrier or the machine vision camera can be combined to an exterior of a tractor coupled to the first storage carrier. The machine vision camera can be an RGB, Infrared, or Thermal imaging processing machine vision camera.

A processor in communication with the machine vision camera can be provided for processing images from the machine vision camera. The processor receives a plurality of time-sequenced images from the machine vision camera and determines the beginning of the offloading event by comparing the plurality of time-sequenced images with images in a library of tagged events. In response to the beginning of the offloading event, the processor communicates to the scale controller causing the scale controller to enter the tear mode and store the weight of material as measured by the sensor offloaded from the first storage carrier to the second storage carrier.

In another embodiment, a method for measuring weight of material is disclosed. The method comprises monitoring the weight of material in a first storage carrier and detecting with a machine vision camera an offloading event in the form of material expelling into a second storage carrier. The method continues with entering a tare mode on a scale controller connected to a sensor on the first storage carrier when the offloading event is detected by the machine vision camera and weighing the material during the offloading event. The method continues with detecting with the machine vision camera an end of the offloading event and ending the tare mode on the scale controller upon detection of the end of the offloading event.

In an embodiment, the method comprises recording a tare value corresponding to a weight of the material expelled from the first storage carrier during the offloading event and can include recording a geographical location of the first storage carrier upon the detection of the ending of the tare mode of the scale controller and recording an identification of the first storage carrier with an image sensing device upon the ending of the tare mode of the scale controller.

The method can include receiving a plurality of time-sequenced images from the machine vision camera and determining a beginning of the offloading event by comparing the plurality of time-sequenced images with images in a library of tagged events. In response to the beginning of the offloading event, the method continues by entering the tear mode on the scale controller and storing the weight of material as measured by the sensor offloaded from the first storage carrier to the second storage carrier. The method can continue by receiving a plurality of time-sequenced images from the machine vision camera and determining the end of the offloading event by comparing the plurality of time-sequenced images with images in a library of tagged events. When the offloading event ends, the machine vision camera can communicate to the scale controller the end of the offloading event.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

With many recent advances in neural networks, artificial intelligence, machine learning, software language format, and microprocessor computing capabilities, machine vision camera systems have significantly reduced their physical footprint and have become economical for many applications. This allows for large data sets to be captured, trained on remote neural networks in the cloud, and deployed to relatively small, machine vision camera subsystems running a subset of trained neural networks embedded onto the machine vision camera system. Even a smart device, such as an iOS or Android based mobile phone can now receive a deployed machine learning core and be used respectively as a machine vision camera.

This disclosure is directed to detecting the operational states of various machines without a direct interface to the control surfaces or actuators of the machine. With this information, a weight record for the material loaded or unloaded from a storage carrier can be created.

Figure 1:
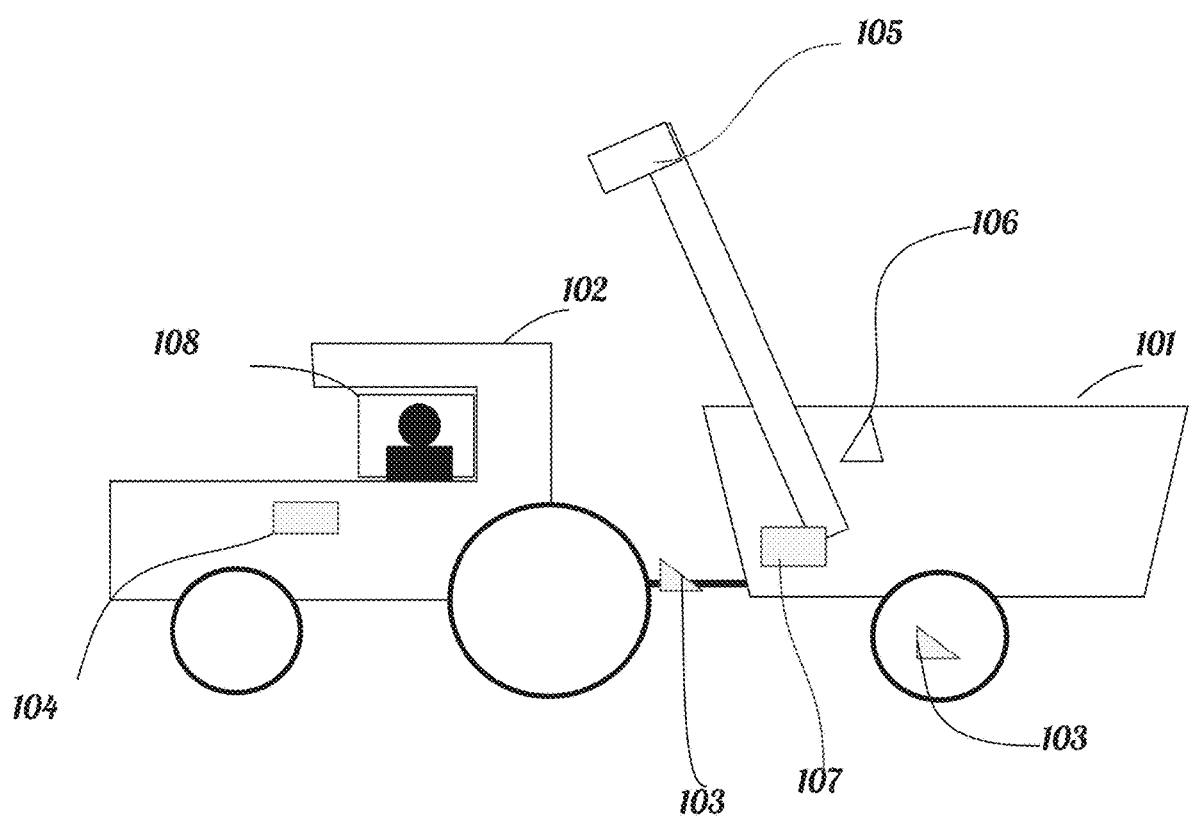
FIG. 1 is a drawing that shows a tractor coupled to a grain cart.

Referring to FIG. 1, shown is a first storage carrier implemented as a grain cart 101 coupled to a tractor 102 for the purpose of acquiring and temporarily storing grain from harvester. Attached to grain cart 101 is an offloading apparatus 105, which can be implemented as an auger system. Offloading apparatus 105 is powered and driven by the tractor 102 with the use of a power take off (PTO) interface. Attached to offloading apparatus 105 is a machine vision camera 106, which can be implemented as one or more of an RGB, infrared, thermal, multi dimension radar, or the like, which detects the presence of material expelling from offloading apparatus 105 of grain cart 101. Machine vision camera 106 is in communication with a scale controller 104, which can include a scale interface for the operator 108 of the tractor 102. Scale controller 104 is also in communication one or more sensors for measuring the weight which can be implemented as load cells 103, which are affixed between the undercarriage of the grain cart 101 and the hopper body. Load cells 103 are used to measure the weight of the grain in the grain cart 101. The weight measurement can be in the form of a discrete weight at a given time or a difference in weight over a period of time to track offloading or offloading of grain from grain cart 101.

Figure 2:
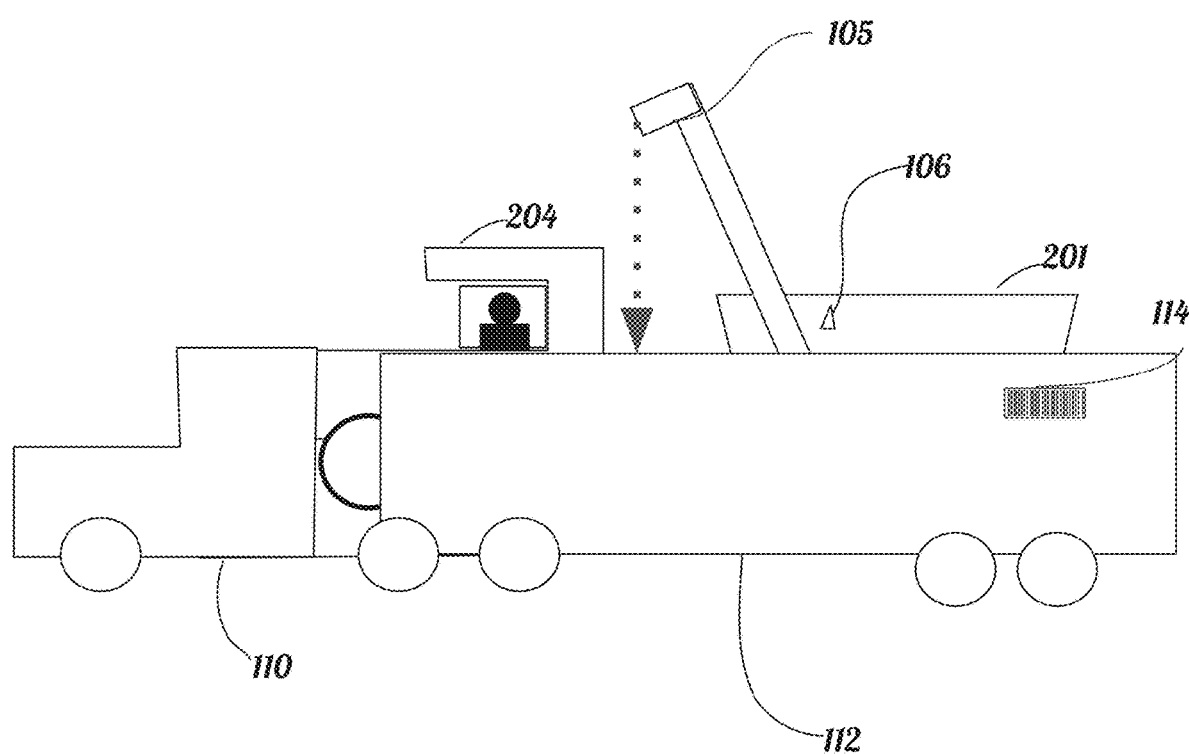
FIG. 2 is a drawing that shows a grain cart offloading material into a semi trailer.

Referring to FIG. 2, shown is grain cart 101 adjacent to a second storage carrier implemented as a semi-truck pulling a hopper trailer 112. When the grain cart 101 approaches the hopper trailer 112, and comes within view of machine vision camera 106, scale controller 104 will begin its workflow to determine the unloaded weight of grain cart 101 into the trailer hopper 112. An exemplary workflow is discussed below in connection with FIG. 6. Trailer hopper 112 can also have an image label 114 which can include a symbol, lettering, barcode, QR code, color, or the like applied to the side of trailer hopper 112. This image label 114 is detected by machine vision camera 106, which is affixed to the side of the grain cart 101, as image label 114 passes by machine vision camera 106. One skilled in the art will understand that machine vision camera 106 can be positioned on either the first storage carrier or the second storage carrier and that the each of such storage carrier can be implemented as any type of container for storing commodity.

Figure 3:
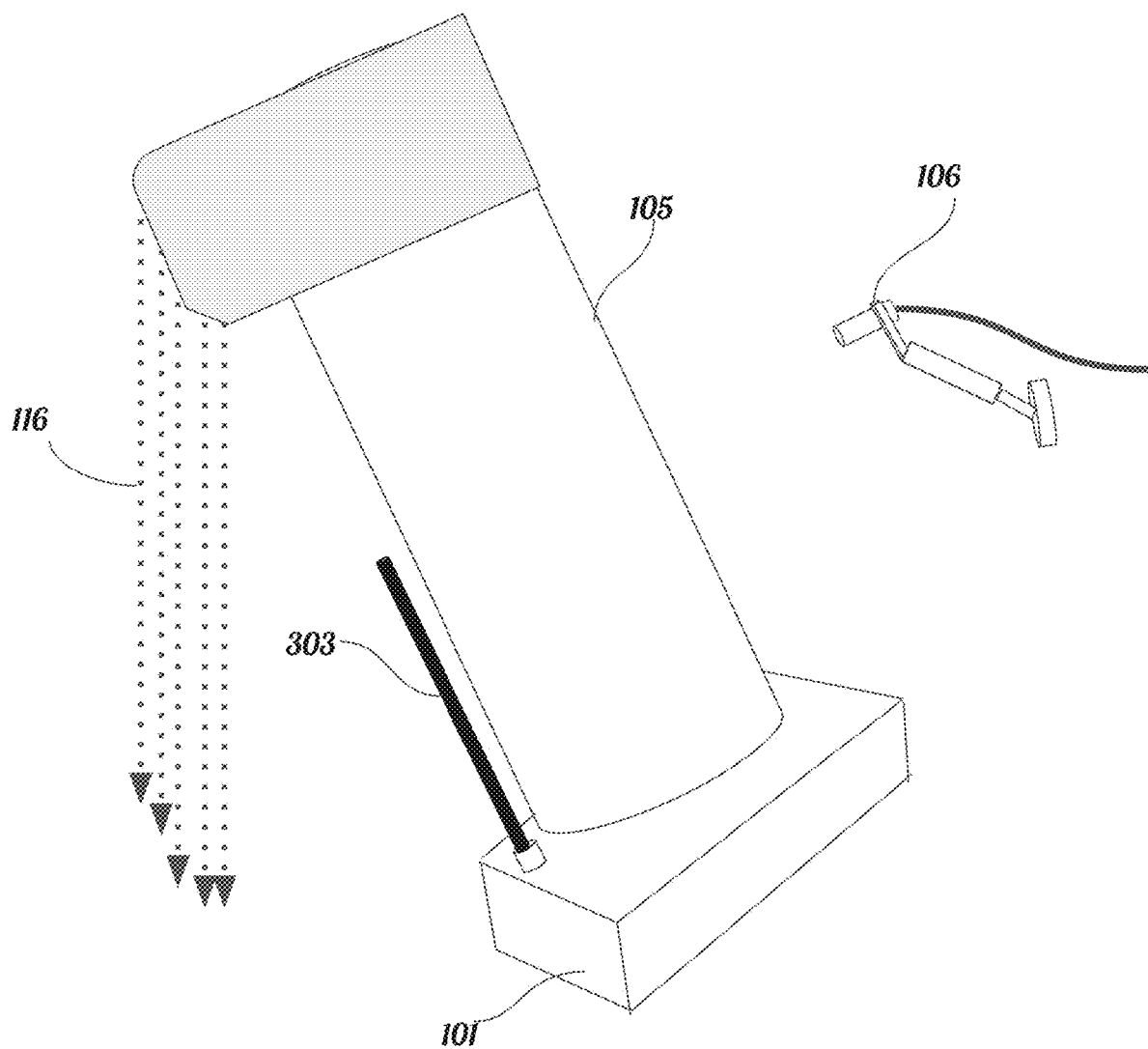
FIG. 3 is a drawing of a sensor mounted to a storage carrier for the purpose of detecting the presence of material expelling through the offloading apparatus affixed to the storage carrier.

Referring to FIG. 3, shown is offloading apparatus 105, in more detail. Machine vision camera 106 is affixed to the side of the grain cart 101 directed toward the spout of the offloading apparatus 105 and trailer hopper 112. When trailer hopper 112 comes within range of the machine vision camera 106, a signal is sent to scale controller 104, providing notification that an identification is present. When operator 108 of grain cart 101 activates offloading apparatus 105, grain material 116 begins to fall from the spout of offloading apparatus 105. Machine vision camera 106 captures images of grain 116 falling out of the spout of offloading apparatus 105.

Figure 4:
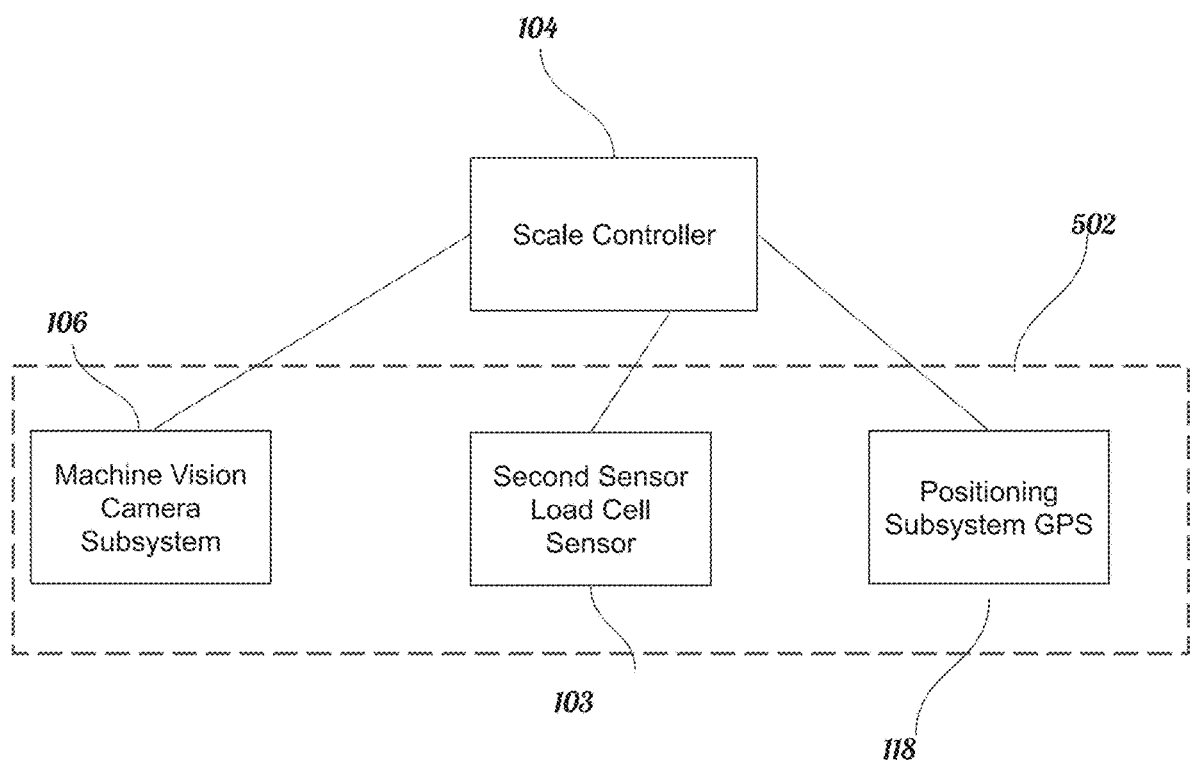
FIG. 4 is a block diagram showing the relationship of the scale controller with the various sensors and sensor subsystems.

Referring to FIG. 4, shown is a block diagram of scale controller 104 and its bidirectional communication with various sensors and subsystems. Scale controller 104 is in communication with machine vision camera 106, which communicates to scale controller 104 that grain 116 is presently expelling from the spout of offloading apparatus 105. Scale controller 104 is also is communication with one or more load cells 103, which is used to sense the weight of grain 116 in grain cart 101. Scale controller 104 is also coupled to a positioning subsystem 118, such as a GPS or the like, which is used to report location information of a "weight event" by scale controller 104. A weight even is an event that triggers the logging of a weight record by scale controller 104. Scale controller 104 also utilizes machine vision camera 106 to identify trailer hopper 112 by its image label 114, as well as provide a stored image for recall for verification of weight record data and traceability of material from grain cart 101.

Figure 5:
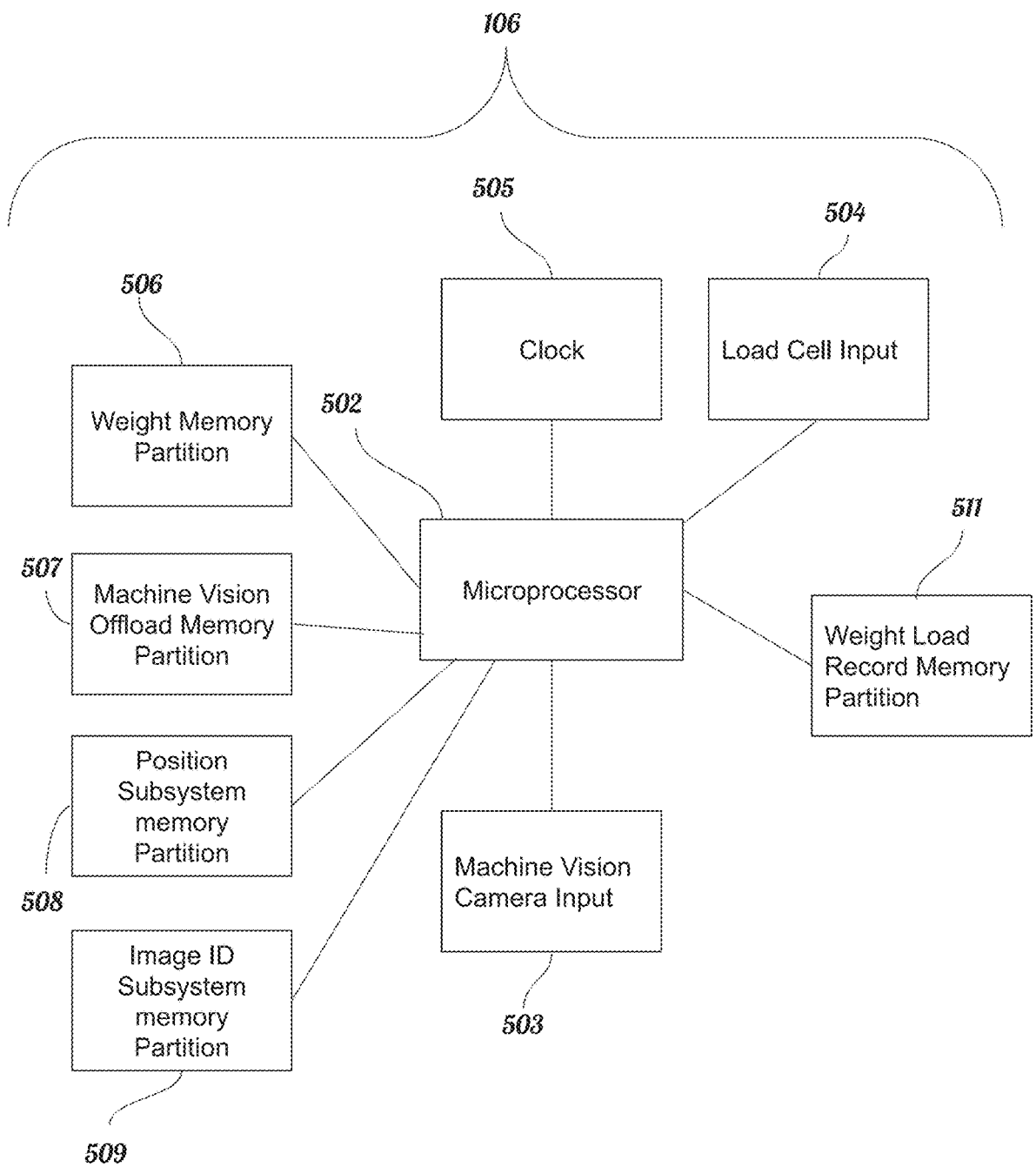
FIG. 5 is a block diagram of the scale controller and microprocessor controller.

Referring to FIG. 5, shown is a block diagram of the scale controller 104 and its processing of the various sensors and subsystems to derive a weight record 511. Minimally, the scale controller 104 contains a microprocessor 502, a clock 505, a load cell input 504, which can be either analog or digital, a machine vision camera input 503, and various forms of memory within the scale controller 104 system which provide temporary and permanent storage of sensor data for the purpose of this embodiment. The microprocessor 502 contains various logic (referred to in the methods of FIG. 6-FIG. 8) to store data in its associated memory partitions regarding a continuous gross weight record 506, first machine vision camera state record 507, location data in the position subsystem partition 508, and machine vision camera identification in the image ID subsystem memory partition 509. The microprocessor 502 logic also contains an executable workflow (again referred to in the methods of FIG. 6-FIG. 8) which derives a weight record and is stored within the weight load record memory partition 511.

Figure 6:
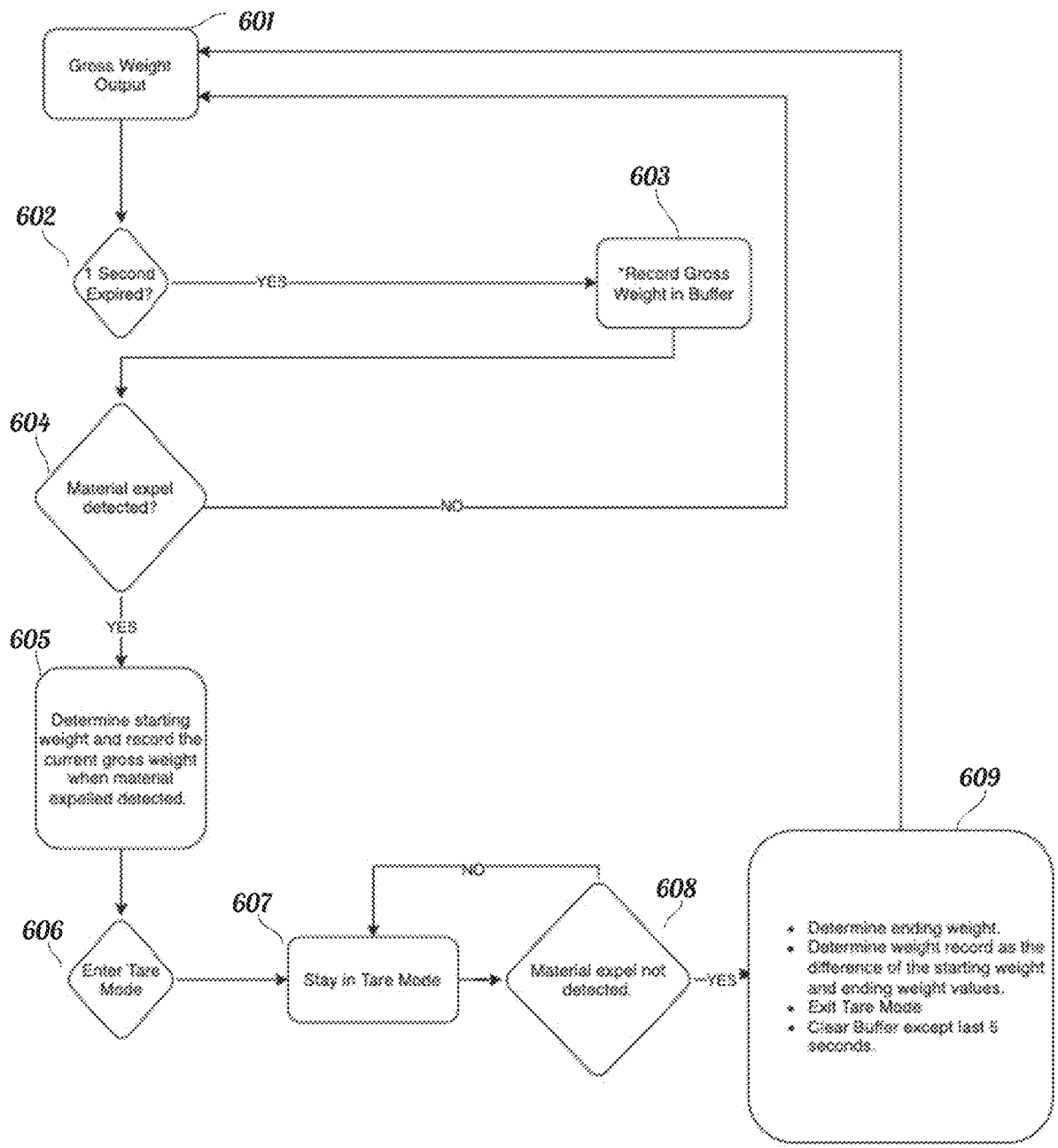
FIG. 6 is a flow chart of the process for determining a weight record in conjunction with a first sensor.

Referring to FIG. 6, shown is a flow chart of the logic of microprocessor 502 to derive a weight record. At the start 601 of the process, scale controller 104 and machine vision camera 106 are in an idle state with a gross weight output. At one second intervals 602, an internal clock records the gross weight measured by load cells 103. Referencing machine vision camera input 503, the method at step 604 detect whether material is being expelled. The foregoing is a continuous loop in one second intervals until material is detected which is recognized as the beginning of an offloading event.

Once material expelled is detected at step 604, the starting weight is determined by obtaining the current gross weight at step 603. After the starting weight is determined, scale controller 104 executes a tare mode 606, which in turn will display a temporary zero on the interface of scale controller 104. As the grain cart operator 108 begins the process of energizing the PTO drive system and opening the gate of grain cart 101, the material inside grain cart 101 will begin to expel from offloading apparatus 105 into second storage container 112. This will be reflected in step 607 as an unload active state or offloading event and as a decreasing weight on the interface of scale controller 104. The unload active state will remain active in the form of a continuous loop at step 608 until the presence of the expelled material is no longer detected at step 608 at which point another signal is communicated from machine vision camera input 503 to scale controller 104.

Next, scale controller 104 will execute a weight record at step 609 by determining the ending weight by obtaining the gross weight output from load cell 103 at load cell input 504 and determining the weight record from the difference between the starting weight determined at step 605 and the ending weight at step 609. The weight record is recorded in a weight memory partition. The tare mode is exited.

Figure 7:
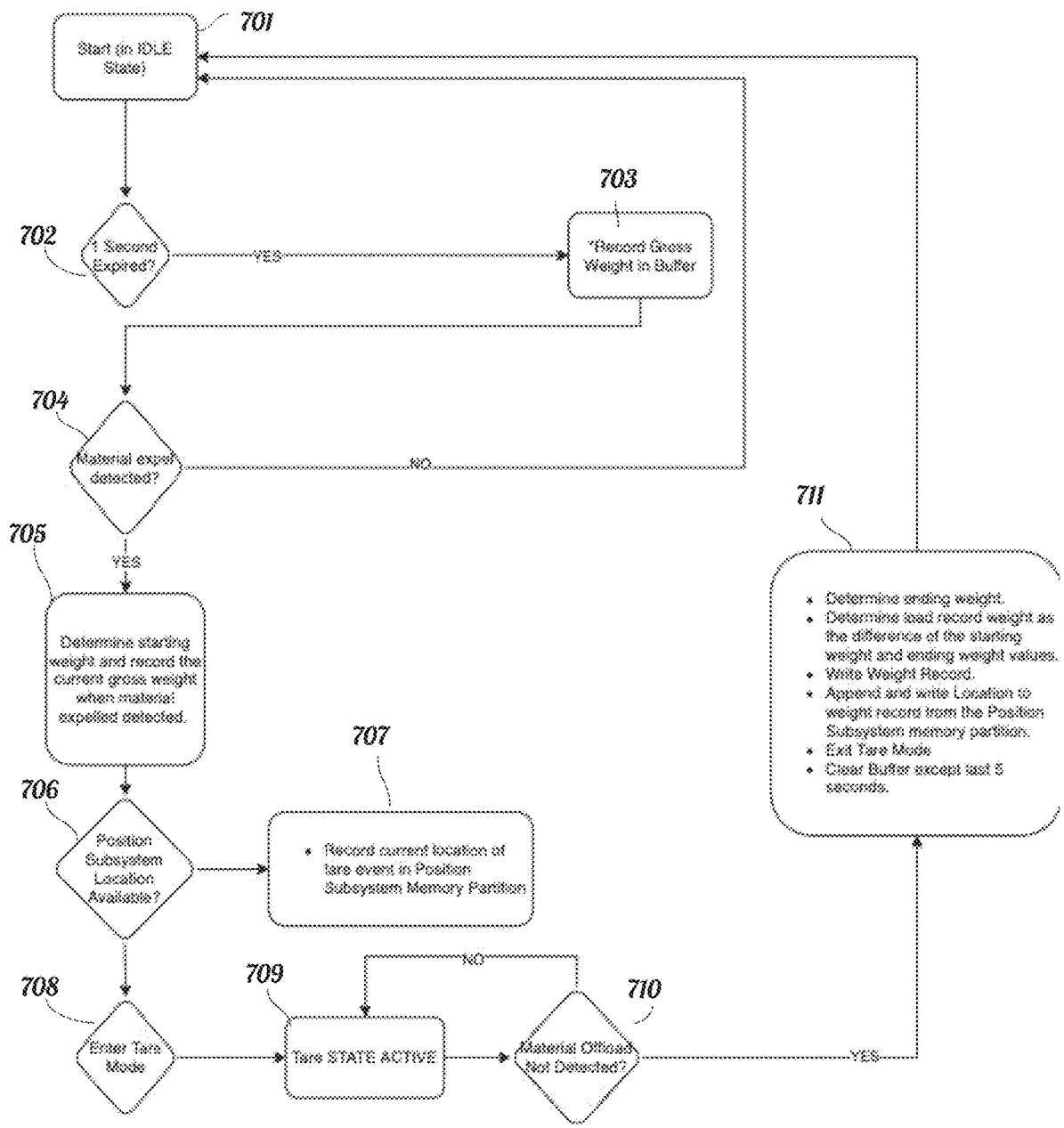
FIG. 7 is a flow chart of the process for appending the location data to the weight record.

Referring to FIG. 7, shown is a flow chart of the logic to derive a weight record with an associated geographical location. The process begins at step 701, scale controller 104 and machine vision camera 106 are in an idle state. Scale controller monitors step 702 load cells 103 at one second intervals of the clock. At step 703, scale controller 104 records the gross weight of grain cart 101 in a revolving weight memory storage buffer 703. At step 704, the method determines whether material is being expelled and, if not, a continuous process of gross weight records are stored at one second intervals in the gross weight memory buffer. One material is detected at step 704, the starting weight is determined by obtaining the current gross weight recorded at step 703. After the starting weight is determined, the scale controller 104 determines at step 706 that the position sub-system location is available and at step 707 records the current location of the tare event in position subsystem memory. At step 708, the scale controller enters a tare mode 708 displaying a temporary zero on the interface. The position subsystem sub-system can be a GPS location system. If the GPS subsystem is within communication and a location is available to poll from the position sub-system, scale controller 104 can record 707 current location of the grain cart within the positional subsystem memory partition of the scale controller (refer to FIG. 5, 508). If no position sub-system is present no record of the location can be created.

As operator 108 of grain cart 101 begins the process of energizing the PTO drive system and opening the gate of the grain cart, the weight of the material inside grain cart 101 will start to expel into second storage container 112. This will be reflected in step 709 at an unload active state as a decreasing weight on the interface of scale controller interface. The unload active state will remain active as a loop until at step 710 the presence of the material expelled 710 is no longer detected. Thereafter, a second signal is sent from machine vision camera input 503 to scale controller 104. At step 711, scale controller 104 will execute a weight record by determining the ending weight as the obtained gross weight and the weight record is determined as the difference between the starting weight from step 705 and the ending weight determined at step 711. Scale controller 104 will then write the weight record in a weight record memory partition with an appended geographical location written and associated with the weight record stored in the positional memory partition of scale controller 104. Scale controller 104 exits the tare mode and clears its gross weight memory buffer, except for the preceding five seconds to the presence object lost. The method returns to the beginning by resuming one second intervals at step 702 of capturing the gross weight reading in the gross weight memory buffer.

Figure 8:
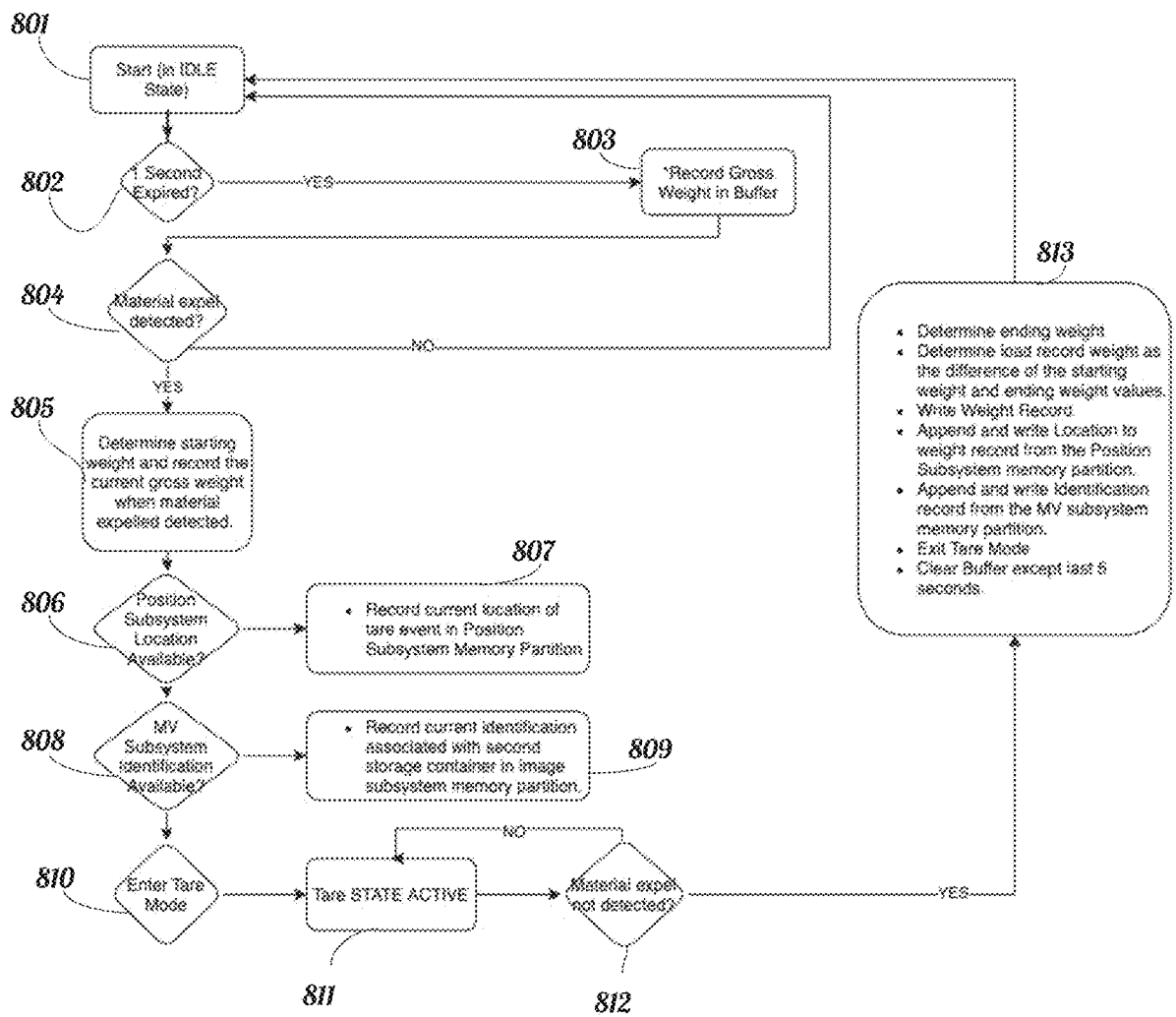
FIG. 8 is a flow chart of the process for acquiring the location data, and image identification data of a secondary storage carrier and appending the data to a weight record.

Referring to FIG. 8, shown is a flow chart for the logic of deriving a weight record with a GPS location and an identification of second storage carrier 112. The method beings at step 801 with scale controller 104 and machine vision camera 106 in an idle state. At step 802, scale controller 104 monitors machine vision camera 106, the load cells 103, and at one second intervals of a clock, records at step 803 the gross weight of grain cart 101 in a revolving weight memory storage buffer. If material expelled is not detected at step 804 by machine vision camera 106 in communication with scale controller 104, the continuous process of capturing the gross weight at one second intervals in the gross weight memory buffer is continued. At step 804, the method checks to determine whether material is being expelled from grain cart 101. If so, the starting weight is determined with the current gross weight from step 803. After the starting weight is determined, scale controller 104 records the current gross weight. A location is requested/polled from the position subsystem at step 806 and recorded in the position subsystem memory at step 807. An identification from the machine vision subsystem is requested/polled at step 808 and associated with the second storage container and recorded in image subsystem memory partition at step 809. Scale controller 104 then enters the tare mode 810.

As operator 108 of grain cart 101 begins the process of energizing the PTO drive system and opening the gate of grain cart 101, the weight of the material inside the grain cart will start to expel into second storage container 112. This will be reflected in at step 811 as unload active state 811 with a decreasing weight on the interface of scale controller 104. The unload active state will remain active until the presence of the expelled material is no longer detected at step 812 otherwise it remains in a loop. Once machine vision camera 106 indicates that material is no longer being expelled, a second signal is communicated to scale controller 104. Scale controller 104 then executes at step 813 the weight record by determining the ending weight as the obtained gross weight and determining the difference between the starting weight obtained at step 805 and the ending weight obtained at this step 813. Scale controller writes the weight record in a weight record memory partition with an appended location that is written and associated with the weight record associated with the location obtained at step 807 and stored in the positional memory partition of the scale controller and with an identification of secondary storage carrier 112 stored in the image subsystem memory partition at step 809 of scale controller 104. Scale controller then exits tare mode and clears its gross weight memory buffer.

Figure 9:
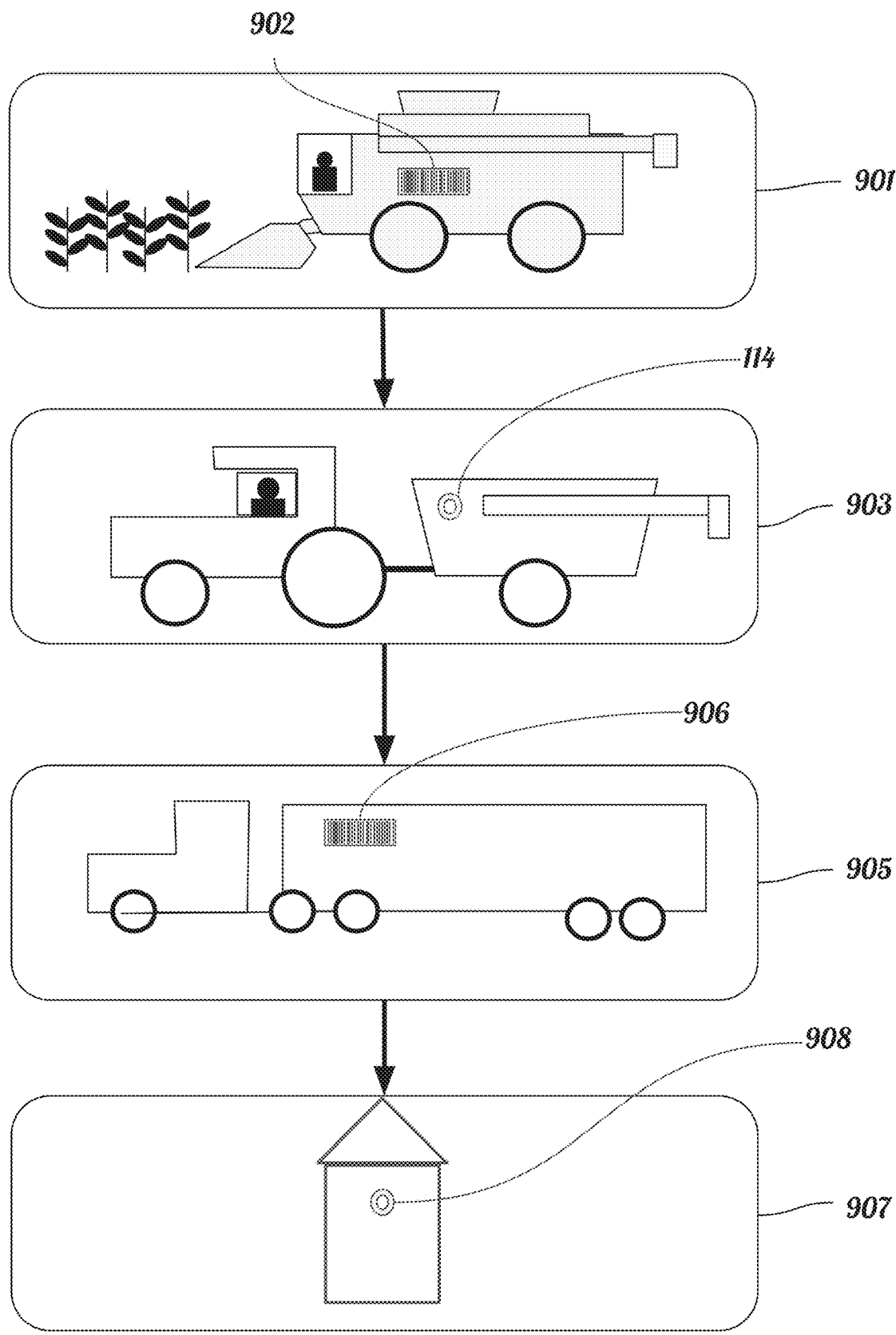
FIG. 9 is a drawing depicting an embodiment of the implementation of the material traceability system.

Referring to FIG. 9, shown is a diagram of the traceability of the origin of material through the destination of the material. Affixed to the side of a combine harvester 901 is an image label 902 easily viewable from a distance. The combine harvester gathers grain material in the field and expels periodically into a grain cart 903 (which can correspond to grain cart 101). Image label 902 identification is registered in a remote database in communication with scale controller 104 located on grain cart 903. When the harvester 901 receives a material transfer from the combine harvester 901 in the field, machine vision camera 106 captures the identification of the combine harvester and communicates the identification of the combine harvester 901 to scale controller 104. Scale controller 104 further records the combine harvester identification in the image subsystem memory (referenced in FIG. 5), and retains the record until a weight transfer transaction is accomplished by grain cart 903 offloading into a semi-truck trailer 905.

Scale controller 104 of the grain cart 903 is within communication with a position subsystem (referenced in FIG. 5). Scale controller 104 records the location of the transfer from combine harvester 901 into grain cart 903 and stores this information in the position subsystem memory of scale controller 104 (referenced in FIG. 5). The same process for offloading the material to semi-truck trailer 905 also occurs. Machine vision camera 106 can capture an image of image label 906 on the side of semi-truck trailer 905. When the semi-truck trailer 905 receives material from grain cart 903 in the field, machine vision camera 106 on grain cart 903 captures the identification of the semi-truck trailer 905 and communicates its identification to scale controller 104 for recording in the image subsystem memory 509 (referenced FIG. 5). Once the material transfer is completed from the grain cart 903 to the semi-truck trailer 905, the record of weight transaction is created in scale controller 104 and transmitted to the remote server with the associated locations, identifications, and weight record of the material traceability record. Associated software in the server marks the transaction as incomplete, as the associated weight record transaction ID with the semi-truck trailer does not provide a destination identification. As the semi-truck trailer 905 arrives at a destination 907, however, a camera subsystem 908 at destination 907 that is in communication of the remote server identifies semi-truck trailer 905 and communicates the identification to the remote server where semi-truck trailer 905 is associated weight transaction that was marked as incomplete is updated with the destination and marked it as complete.

Figure 10:
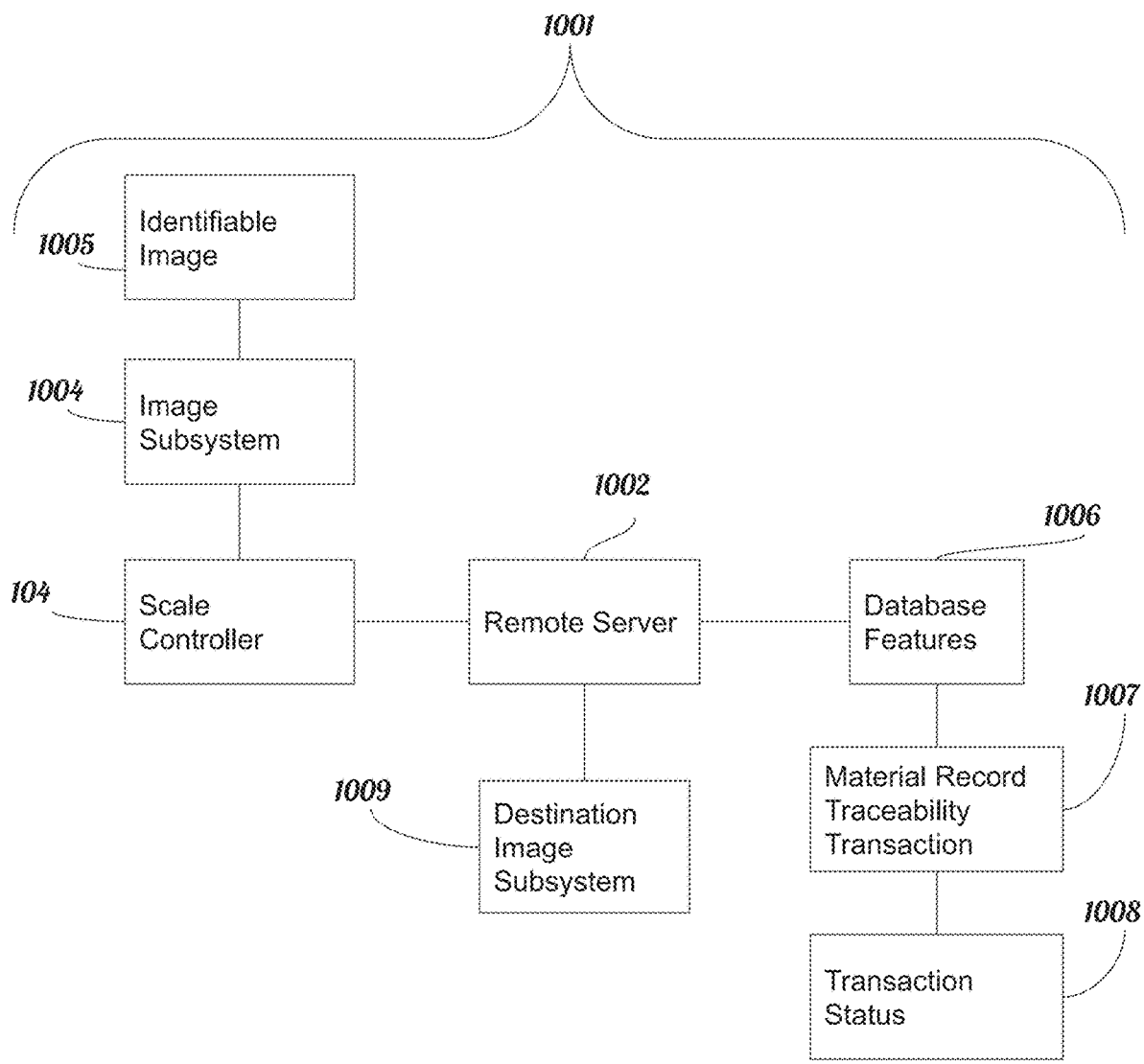
FIG. 10 is a block diagram of the system for traceability of the material origin through material destination.

Referring to FIG. 10, shown is a block diagram of the traceability of the material transfer 1001. The traceability of the material transfer 1001 involves a remote server 1002 within communication of scale controller 104 that is associated with grain cart 101. Scale controller 104 is in further communication with an image subsystem 1004 which identifies an identifiable image such as a barcode or characters to the scale controller. The image identification is commonly associated with a secondary or third storage carrier that is pre-registered within a database feature of the remote server. When the scale controller 1003 completes a material transfer from grain cart 101 into a secondary storage carrier, the identification of the image 1005 is communicated to the remote server 1002 and stored as an incomplete material traceability record 1007 as there is no arrival event recorded to the destination to mark the material traceability record status 1008 as complete. As the secondary or third storage container arrives at a destination, an image subsystem 1009 mounted in the proximity of the destination, identifies the secondary or third storage carrier. The destination image subsystem is within communication of the server which identifies the incomplete record associated with the secondary or third storage carrier and marks the record as complete.

Figure 11:
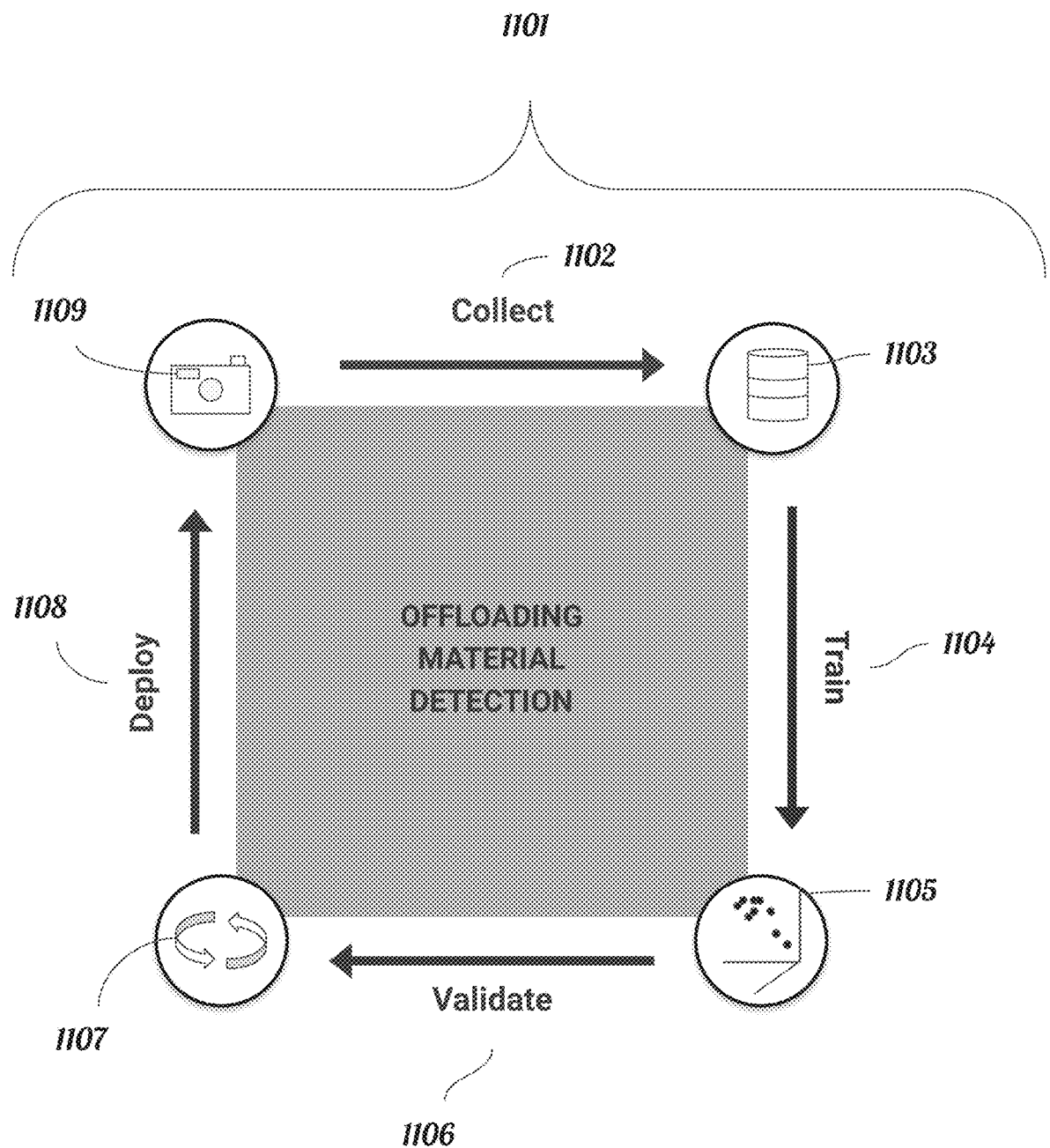
FIG. 11 is a block diagram of the machine learning training cycle that is embedded in the machine vision camera system as related to the expelling of material and detection.
Figure 12:
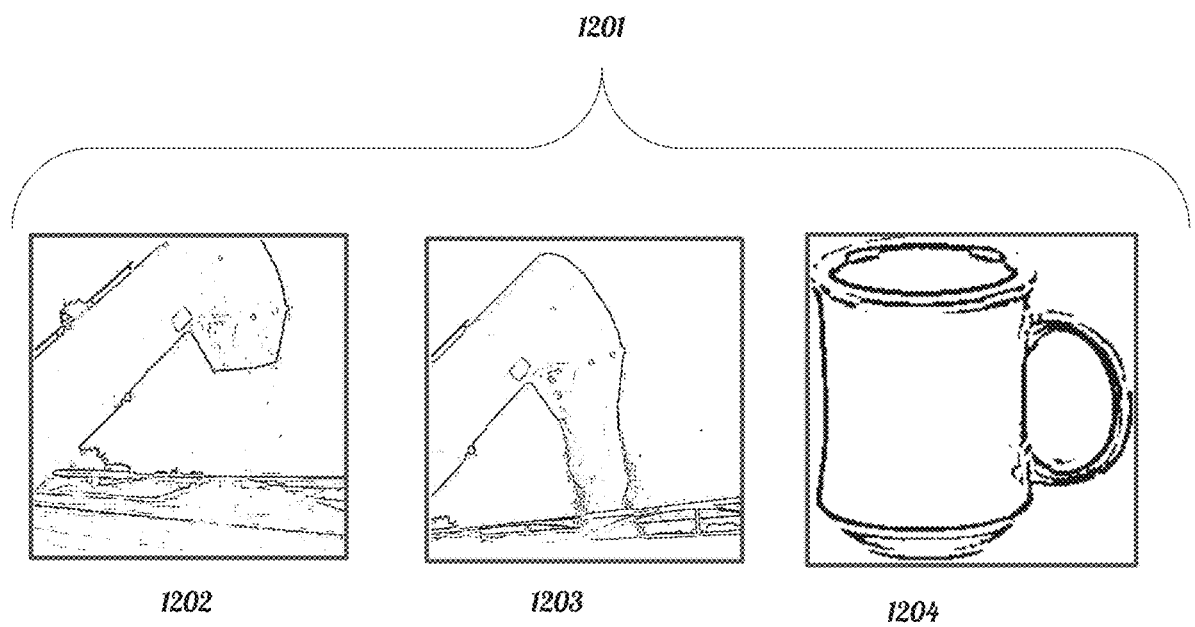
FIG. 12 is a drawing showing an example of the data set collected to execute the machine learning training.

Referring to FIG. 11, shown is a block diagram of the machine learning training process 1101, used to detect the expelling of material from a grain cart. In order to properly identify the state of material expelling from the grain cart, a complete data set 1103 must be collected. The effort to collect 1102 the data set involves capturing still images of the various machine states showing active expelling, and not expelling, as well as a library of images not associated with the machine state. This data set, which is further referenced in FIG. 12, is evaluated by a neural network service to determine attributes and train 1104 on the differences that differentiate the images from each other, representing different machine states or attributes. Once the neural network has identified the attribute 1105 of the image database, a machine learning core is created as a subset of the neural network. The machine learning core is then validated 1106 against the collected data determining the probability of the machine learning core to determine the collected images machine state. This is further tested 1107 amongst new images to determine the machine learning core performance to evaluate the data set representation of expelling material detection. Once the machine learning core is further validated 1106 and tested 1107, the machine learning core is sub-packaged into an executable code base and deployed 1108 and transferred to a machine vision camera system 1109. This process is cyclical and involves a never-ending cycle of data collection, evaluation, testing, and deployment to increase the probability of expelling material detection.

Referring to FIG. 12 is a complete data set 1201 of images related to the expelling of material from grain cart 101. This data set represents images captured in reference of the offloading apparatus (auger) of grain cart 101, as well as unrelated objects. Image 1202 of the offloading auger depicts no material expelling from the grain cart. This is apparent by the lack of edging produced by the image below the spout of the auger. Image 1203 of the offloading auger depicts material expelling from the auger. This is apparent by the edging cascading downward from the spout of the auger. Image 1204 is of an unrelated object, such as a coffee cup, is also added to the database to provide a better comparison of outliers to prevent false identifications of expelling states by the machine learning core. The system is trained with hundreds or thousands of such arbitrary or unrelated images. Although the data set could potentially perform very well with the three labels of data shown in the drawing, it requires multiple images of the same label in different variations and qualities of image to strengthen the probability accuracy of the machine learning core and help with the training of attributes reference in FIG. 11.

Figure 13:
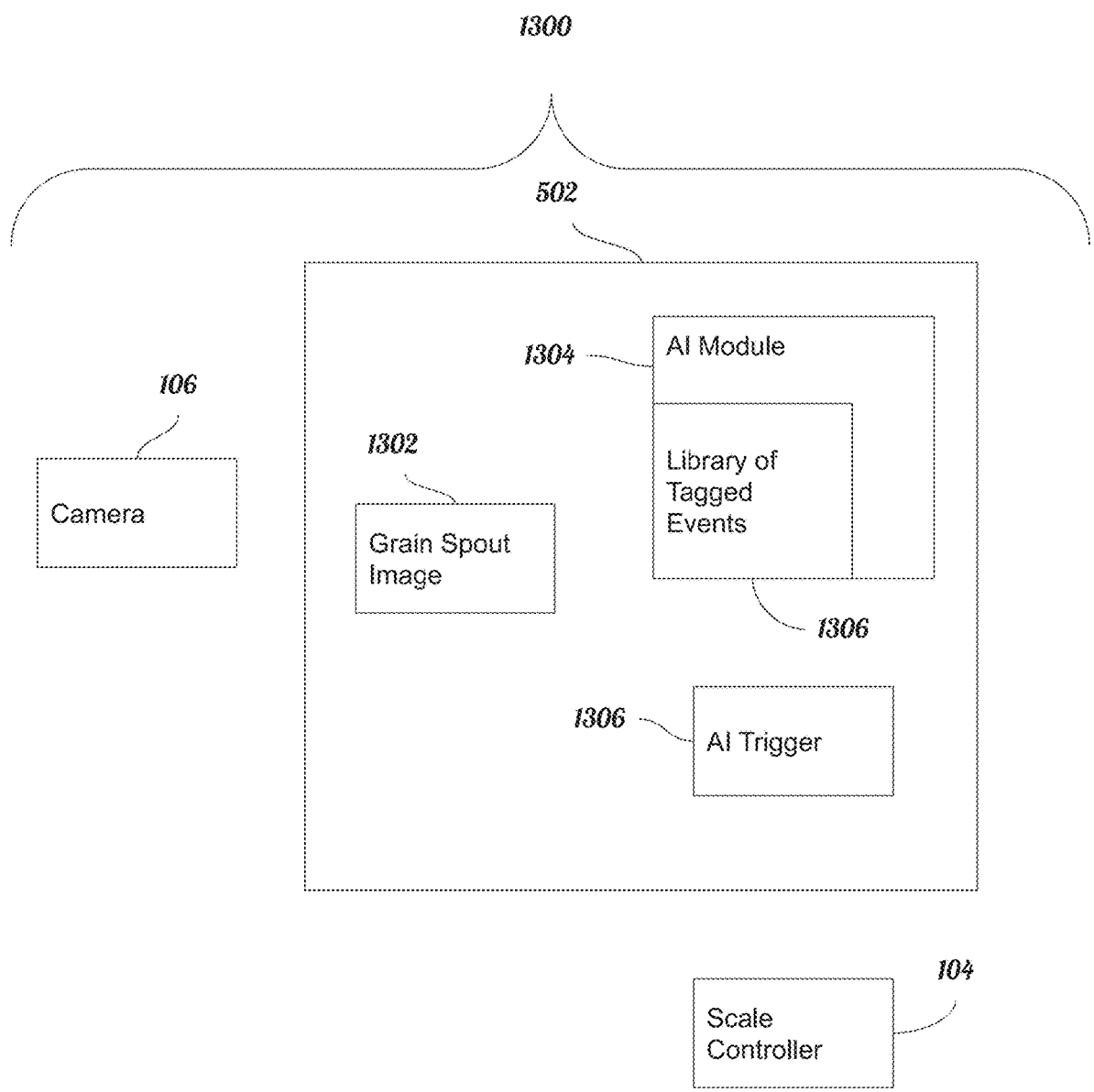
FIG. 13 is a block diagram of the AI module in the processor of FIG. 5.

FIG. 13 shows system 1300 for measuring the weight of material, which is trained with data set 1201. System 1300 incorporates machine vision camera 106 for capturing images 1302 and scale controller 104 for processing images 1302. System 1300 continuously analyzes the incoming images 1302 to determine and identify an offloading event. The processor in scale controller 104 can receive a plurality of time-sequenced images 1302 from machine vision camera 106. From images 1302, scale controller 104 can determine, using an artificial intelligence module 1304 an offloading event from a first subset of images of the plurality of time-sequenced images 1302. When an offloading event is detected, alert trigger 1306 can be activated.

To carry out the analysis described in system 1300, a machine learning analysis program may be used. In such an implementation, system 1300 can determine from at least one characteristic of image 1302 an offloading event. System 1300 shows a machine learning analysis algorithm comprising the foregoing instructions that are executable on one or more processors inside scale controller 104.

Images 1304 are recorded continuously and provided to artificial intelligence (AI) module 1304, as described above and also referred to as a machine learning or machine intelligence module. AI module 1304 may include a neural network (NN), e.g., a convolutional neural network (CNN), trained to determine an offloading event. Any suitable AI method and/or neural network may be implemented, e.g., using known techniques. For example, a fully convolutional neural network for image recognition (also sound or other signal recognition) may be implemented using the TensorFlow machine intelligence library.

AI module 1304 includes a library of data sets 1201. Within this library, each individual image 1202, 1203, and 1204 is tagged to identify and tag the point in time of an offloading event to create library of tagged action events 1308. AI module 1304 uses this library of tagged action events 1308 to compare in real-time images 1302 that are recorded continuously and provided to artificial intelligence (AI) module 1304, From this comparison, the neural network may provide a confidence level with respect to its determination that an offloading event is occurring. In other words, one or more processors comprising AI module 1304 is in communication with machine vision camera 106 and is configured for determining from images 1302 and comparing with library of tagged action events 120 an offloading event.

One or more components of the systems and methods for measuring the weight of material expelled can comprise any collection of processor-based devices or computing devices operating together, or components of processing systems or devices, as is known in the art. The processing system in scale controller 104 or machine vision camera 106 can include, for example, one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system. In this regard, it should be noted that scale controller 104 can be replaced with mobile device 109. The weight information can be transmitted to a mobile device and processed by an associated mobile application where the data is stored in a remote server.

The processing system of an embodiment includes at least one processor and at least one memory device or subsystem in scale controller 104 or machine vision camera 106. The processing system can also include or be coupled to at least one database. The term "processor" as generally used herein refers to any logic processing unit, such as one or more central processing units (CPUs), digital signal processors (DSPs), application-specific integrated circuits (ASIC), microprocessor, etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the systems and methods of weighing commodity can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages. These communication paths can connect, for example, scale controller 104 and scale controller 104 and mobile device.

Aspects of the systems and methods of weighing commodity and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods: microcontrollers with memory (such as electronically erasable programmable read only memory (EEPROM)), embedded microprocessors, firmware, software, etc. Furthermore, aspects of the systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Devices, systems, and subsystems referenced herein are understood to have consistent meanings and interpretations, unless stated otherwise. The scale controller, for example, is understood to have the same or similar functionality when used in the various embodiments described here, including in each the descriptions accompanying the Figures herein.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A system for measuring a weight of material offloaded from a first storage carrier to a second storage carrier, the system comprising:
   a machine vision camera combined to one of the first storage carrier and the second storage carrier for detecting an offloading event;
   a sensor for measuring the weight of material offloaded from the first storage carrier to the second storage carrier;
   a scale controller in communication with the machine vision camera and the sensor wherein the scale controller enters a tear mode in response to the offloading event and records and stores the weight of material offloaded from the first storage carrier to the second storage carrier as measured by the sensor;
   a processor in communication with the machine vision camera for processing images from the machine vision camera, wherein the processor receives a plurality of time-sequenced images from the machine vision camera and determines a beginning of the offloading event by comparing the plurality of time-sequenced images with images in a library of tagged events; wherein in response to the beginning of the offloading event, the processor communicates to the scale controller causing the scale controller to enter the tear mode and store the weight of material as measured by the sensor offloaded from the first storage carrier to the second storage carrier.

2. The system of claim 1, wherein the scale controller is in communication with machine vision camera a first signal representative of the offloading event and in response to the offloading event records a beginning weight, and wherein the scale controller receives from the machine vision camera a second signal representative of the end of the offloading event, and in response records an ending weight, and wherein the scale controller determines a weight record for the material offloaded from the first storage carrier to the second storage carrier from a difference in weight.

3. The system of claim 2, wherein the scale controller is in communication with a position subsystem and wherein the scale controller records a location of the weight recording.

4. The system of claim 2, wherein the scale controller records an identification of the second storage carrier associated with the weight record.

5. The system of claim 3, wherein the scale controller comprises a scale interface to present to a visual display of a changing weight.

6. The system of claim 5, wherein the system further comprises an image ID subsystem for identifying an image label to associate with one of the first storage carrier and the second storage carrier.

7. The system of claim 3, wherein the positional subsystem comprises a GPS receiver to provide a location of the first storage carrier.

8. The system of claim 1, wherein the machine vision camera is combined to an exterior of the one of the first storage carrier and the second storage carrier.

9. The system of claim 1, wherein the machine vision camera is combined to an exterior of a tractor coupled to the first storage carrier.

10. The system of claim 1, wherein the machine vision camera is one chosen from an RGB, Infrared, or Thermal imaging processing machine vision camera.

11. A method for measuring weight of material, the method comprising:
monitoring the weight of material in a first storage carrier;
detecting with a machine vision camera an offloading event of material expelling into a second storage carrier;
entering a tare mode on a scale controller connected to a sensor on the first storage carrier when the offloading event is detected by the machine vision camera;
weighing the material during the offloading event;
detecting with the machine vision camera an end of the offloading event; and
ending the tare mode on the scale controller upon detection of the end of the offloading event, wherein the detecting with a machine vision camera an offloading event, further comprises receiving a plurality of time-sequenced images from the machine vision camera; and determining a beginning of the offloading event by comparing the plurality of time-sequenced images with images in a library of tagged events.

12. The method of claim 11, further comprising recording a tare value corresponding to a weight of the material expelled from the first storage carrier during the offloading event.

13. The method of claim 12, and further comprising recording a geographical location of the first storage carrier upon the detection of the ending of the tare mode of the scale controller.

14. The method of claim 13, and further comprising recording an identification of the first storage carrier with an image sensing device upon the ending of the tare mode of the scale controller.

15. The method of claim 11, wherein in response to the beginning of the offloading event, entering a tear mode on the scale controller and storing the weight of material as measured by the sensor offloaded from the first storage carrier to the second storage carrier.

16. The method of claim 15, wherein detecting with the machine vision camera the end of the offloading event further comprises receiving a plurality of time-sequenced images from the machine vision camera; and determining the end of the offloading event by comparing the plurality of time-sequenced images with images in a library of tagged events.

17. The method of claim 16, wherein ending the tare mode on the scale controller upon detection of the end of the offloading event, further comprises communicating from the machine vision camera to the scale controller the end of the offloading event.

* * * * *